Feb. 17, 1970 R. S. WALLACE 3,495,787

TAPE CASSETTE ASSEMBLY

Filed June 22, 1967 2 Sheets-Sheet 1

INVENTOR.
ROBERT S. WALLACE

BY Whittemore & Hulbert [signature]

Feb. 17, 1970 R. S. WALLACE 3,495,787

TAPE CASSETTE ASSEMBLY

Filed June 22, 1967 2 Sheets-Sheet 2

INVENTOR.
ROBERT S. WALLACE
BY Whittemore and Hulbert

United States Patent Office 3,495,787

Patented Feb. 17, 1970

3,495,787

TAPE CASSETTE ASSEMBLY

Robert S. Wallace, 2706 S. Robertson Blvd., Los Angeles, Calif. 90034

Filed June 22, 1967, Ser. No. 647,990

Int. Cl. G11b *23/04*

U.S. Cl. 242—199 13 Claims

ABSTRACT OF THE DISCLOSURE

The disclosure concerns magnetic tape cassette structures employing dual reels and incorporating only a few separate parts; provision for automatic interlock of hinged receptacle and cover elements; provision of ribbing and tape guides integral with the case to reduce frictional drag of the tape; and provision of one-piece reels with tape gripping jaws.

BACKGROUND OF THE INVENTION

This invention relates generally to magnetic tape cassettes, and more particularly concerns a different approach to the construction and operation of such cassettes adapting them to high production techniques, simplifying their structure in unusually advantageous ways, and improving the functioning of such devices during tape recording or playback.

Tape cassettes constructed in the past have been characterized by difficulties in assembly of their components as well as of tape loading into the cassette. This is occasioned by inclusion of many lightweight parts which must be hand assembled and adjusted to fit together precisely. When the cover is laid in position to complete the assembly, it is difficult to fit or align it to the guide roller pins, to the reels, to an anti-friction sheet, to a metal plate and to the tape itself. Assembly errors are easy to make, and any misfits during assembly can lead to incorrect tape tracking and excessive tape drag, producing malfunctioning during playback or recording. Also, the cost of the many cassette parts (over 25 in toto) as well as the cost of labor involved in their assembly, are quite serious problems.

BRIEF SUMMARY OF THE INVENTION

It is a major object of the invention to overcome the above problems through an unusually different approach to construction and operation of a cassette. Basically, the cassette of the invention is constructed to require assembly of only a very few separate parts, which produce no alignment problems during such assembly. Also, the cassette cover and receptacle interlock automatically as they are placed together, obviating later connection steps such as screwing or bolting these elements together.

The magnetic tape cassette environment of the invention comprises cover and receptacle elements defining a case with apertures along an edge of the case for exposing tape to contact with playback unit heads, a pair of tape reels mounted to rotate within the case, the cover and receptacle having opposite walls and openings contained in at least one of the walls through which the reels are exposed for driven engagement with playback unit guide posts, a segment of the tape passing between tape rolls on the reels as the tape unwinds off the roll on one reel and winds on the roll on the other reel in response to post rotation. In accordance with one important aspect of the invention, there are multiple tongue and groove interconnections on the cover and receptacle elements for distributing interconnection loading; the tongues and grooves project generally normal to the one wall containing the openings and also parallel to that wall; and the cover and receptacle are relatively closable together normal to that one wall and then relatively movable parallel to that wall to interfit the tongues and grooves acting to guide such relative movement of the cover and receptacle elements for bringing the openings in that one wall into generally central registration with the reels. In accordance with another major aspect of the invention, strap hinge means interconnects the cover and receptacle at another edge of the case spaced from the apertured edge; the hinge means and the cover and receptacle consist of integrally molded plastic material; and the hinge means accommodates folding together, or booking, of the cover and receptacle elements for interconnection, as well as snap-lock interconnection of the cover and receptacle.

Additional objects and advantages of the invention include the provision of reel construction in such relation to annular flanges on the insides of the cover and receptacle walls that the reel is confined by the terminals of the flanges to rotate in spaced relation to those walls, as will be described; the provision of spaced, narrow ribs on the inner sides of those walls to project away from the wall openings to support the tape rolls during roll rotation on the reels; the provision of catch and shoulder elements that produce automatic snap-locking together of the cover and receptacle, and that also permit opening of these elements after deflection of the catch; the provision of a resilient plastic pressure arm integral with the receptacle and a tape engaging pressure pad on that arm to space the tape from dragging against the arm; the provision of guides integral with the receptacle or cover to guide tape segment travel past the apertures, the guides having ribs defining touch points for tape engagement acting to turn the path of tape travel proximate corners of the case; and the provision of a cantilever jaw on a tape reel, the reel having a lip and the jaw being movable from an outer position spaced from the lip to an inner position in which the jaw terminal is retained by the lip, the tape terminal being insertible between the reel and jaw in the outer position of the jaw, and the tape terminal being clamped to the reel by the jaw in the inner position of the latter.

These and other objects and advantages of the invention, as well as the details of an illustrative embodiment, will be more fully understood from the following detailed description of the drawings, in which:

DESCRIPTION OF THE PREFERRED EMBODIMENT

General arrangement

Figures 1, 2, 3, 4, 5, 7, 8, 9:
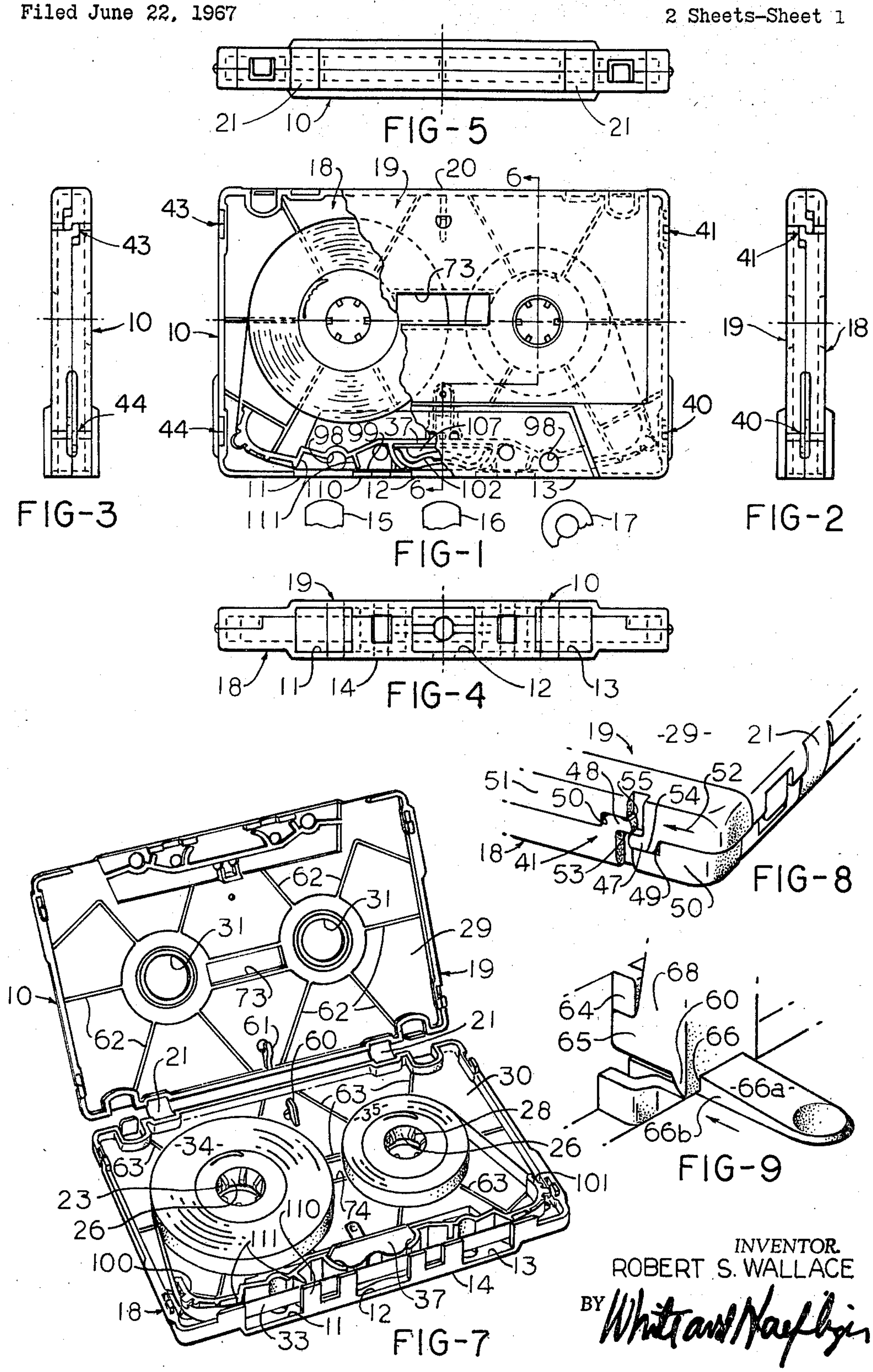
FIG. 1 is a plan view of a cassette embodying the invention, the cover being broken away to show interior construction.
FIGS. 2–5 are right, left, front and rear edge views of the cassette of FIG. 1.
FIG. 7 is a perspective view showing the interior construction of the FIG. 1 cassette, the cover and receptacle being in partly folded but open condition.
FIG. 8 is an enlarged perspective showing a corner of the case and locking and hinging structure.
FIG. 9 is an enlarged perspective showing another locking detail.

Referring first to FIGS. 1–8, the tape cassette includes a case 10 of generally rectangular shape with apertures 11–13 spaced along front edge 14 for exposing a tape segment 33 traveling adjacent such zones to contact with playback unit heads. The latter include erase head 15, record or playback head 16 and pressure roller 17.

The case includes shallow receptacle and cover elements 18 and 19 which may typically be interconnected at rear edge 20 as by strap hinges 21. The arrangement is such that the hinges, cover and receptacle may consist of a one-piece plastic injection molding. In this regard, the cover and receptacle are recessed at the locations where the hinges connect with them, as is clear from FIGS. 7 and 8. Also, the spaced hinges facilitate folding together of the receptacle and cover elements into position for interfitting of tongue and groove connections as will be described.

Figure 14:
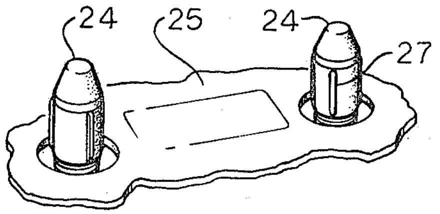
FIG. 14 is a perspective view showing drive post locations.

Completing the general organization, the cassette includes two tape reels 23 mounted to rotate within the case on and in conjunction with posts 24. The latter are incorporated on a playback unit, a portion of which is indicated at 25 in FIG. 14. When the cassette is correctly placed on the playback unit, the posts penetrate through openings 26 in the reels, and ribs 27 on the post mesh with radial projections 28 on the reels, for driving engagement therewith. In this regard, the cover and receptacle walls 29 and 30 respectively contain openings 31 and 32 through which the posts project depending upon whether the cassette is placed receptacle side down, or cover side down, on the posts. Tape in the cassette includes a segment or loop 33 passing between tape rolls 34 and 35 on the reels as the tape unwinds off the roll on one reel and winds on the roll on the other reel in response to post rotation. The tape typically may have two tracks, one for use with the magnetic head when the tape loop travels in one direction, say with the receptacle side down on the playback unit, and the other track for use with the magnetic head when the tape loop travels in the opposite direction, as for example when the cassette is inverted to extend cover side down on the playback unit.

As will appear, the overall construction is such that a minimum of parts is required, and in one preferred embodiment only four parts comprise the assembly as contrasted with well over twenty parts in other commercial cassette units. The four parts include the one-piece plastic cover and receptacle and associated structure, the two plastic reels 23, and a mu-metal plate 37 which magnetically cooperates with the playback or record head. The reel and cover plastic may consist of polypropylene, or super high impact styrene.

RECEPTACLE AND COVER INTERCONNECTION

Figure 10:
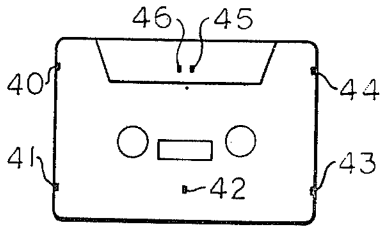
FIG. 10 is a schematic plan view showing multiple locking point locations.
Figure 11:
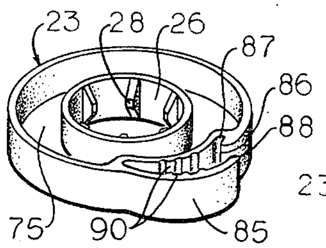
FIGS. 11–13 are enlarged perspective, plan and elevation views of a tape reel.
Figure 13:
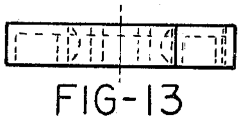

Referring now to FIG. 10, the numbers 40–46 indicate the location of multiple interconnections between the receptacle 18 and cover 19, for distributing interconnection loading over the cassette. Certain of these connections are defined by tongue and groove elements projecting generally normal to the walls 29 and 30, and also parallel to these walls. For example, the interconnection 41 is enlarged in FIG. 8 to show L-shaped tongues 47 and 48 which project both vertically (normal to wall 29) and also parallel to that wall. Tongue 47 on the cover 19 fits downwardly in slot 49 formed in the outer wall 50 of the receptatcle as the cover and receptacle are closed together. Similarly, tongue 48 on the receptacle is received upwardly in slot 50 formed in the outer wall 51 of the cover as the cover and receptacle are closed together. Following the latter, which is aided by the hinges 21 acting to register the tongues and grooves, the cover is moved in the direction of arrow 52 and relative to the receptacle to interfit the L-shaped tongues along interfit locus 53, whereby the cover and receptacle cannot be pulled apart in a direction normal to wall 29. It will further be observed that since the various tongues fit into the grooves at locations 40, 41, 43 and 44 at both ends of the receptacle and cover, the latter elements are guided together as they close relatively together; also when the cover is moved in the direction of arrow 52, the tongues at the above locations guide against shoulders as seen at 54 and 55 in FIG. 8, for bringing the wall openings 31 into generally central registration with the reels 23, and particularly the openings 26 therein. Accordingly, the posts 24 may then enter the walls and reel openings for driving the reels. It should be further noted that grooves 45 and 50 are recessed into the outer sides of the walls 50 and 51, so as not to extend completely through those sides. Accordingly, the tongues may bear in guided relation against the inner faces of those recessed grooves.

Figure 6:
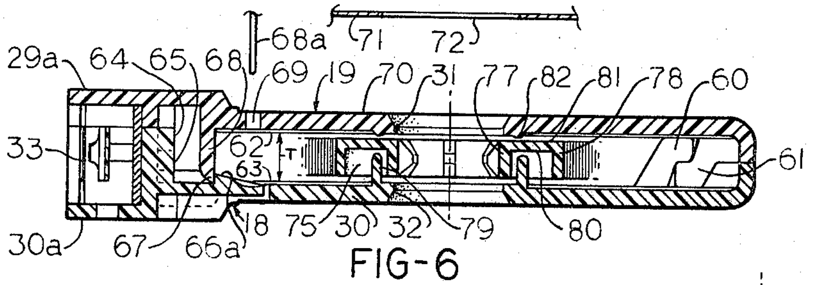
FIG. 6 is an enlarged section taken on line 6—6 of FIG. 1.

The connections at locations 42, 45 and 46 in FIG. 10 appear in greater detail in FIGS. 6 and 7. Such connections include L-shaped tongues 60 and 61 on the cover and receptacle respectively at location 42, and which interfit interiorly of the case when the cover is moved forwardly in the direction of arrow 52 as described above. Such tongues also act to hold walls 29 and 30 apart with predetermined separation T such that the tape rolls will not be clamped between sets of ribs 62 and 63, which will be described.

The connections at locations 45 and 46 include two L-shaped tongues 64 integral with the receptacle, and wide L-shaped tongue 65 integral with the cover. Such tongues interfit interiorly of the case when the cover is moved forwardly in the direction of arrow 52. In addition, a deflectible catch 66 is carried by the receptacle, and a should 67 is carried by the cover element (as on a rib 68 supporting tongue 65), for snap-locking engagement with the catch. For example, when the cover is moved in the direction of arrow 52, the shoulder 67 rides up over the ramp **66*a* on the catch, to resiliently depress the latter and ultimately to snap into locked position as seen in FIG. 9. In that position the catch blocks retraction of the cover relative to the receptacle; however, the catch is on a spring cantilever arm 66*b* as seen in FIG. 9, that is integral with the receptacle, so as to be downwardly deflectible away from the cover to release the shoulder 67, allowing retraction of the cover. Such downward deflection of the ramp shoulder can be effected by insertion of a pin 68*a* through 69 in the cover, as seen in FIG. 6. Normally, re-opening of the case is not desirable, and is discouraged by covering the port 69 with a label 71 bonded to the outer surface 70 of the cassette cover. Such a label may contain a transparent plastic window 72 that registers with a cut-out 73 in the cover allowing viewing of the extent to which tape has spooled off the roll on one of the reels 23 and has wound on the roll on the other reel. Similarly, a cut-out 74 in the receptacle wall 30** may be covered with a label having a transparent window.

TAPE REEL

Referring to FIGS. 6, 11–13 each one-piece reel 23 may advantageously comprise a one-piece plastic molding in the form of a disc. The reel has an annular recess 75 about the reel opening 26 for presentation toward the receptacle wall 30 in FIG. 6, between concentric annular bosses 77 and 78. As seen in that view, an annular flange 79 on the receptacle wall 30 projects into the recess 75 in loosely confining centering relation to boss 77. The rim of flange 79 may engage the inner wall 80 of the reel holding it in the position shown in FIG. 6, in spaced relation to the receptacle wall 30.

The reel also has an annular face 81 presented toward the cover wall 29. An annular flange 82 on wall 29 projects toward the reel face 81 for rim engagement therewith, holding the reel spaced from the wall 29. Accordingly, the reel is confined by the terminals or rims of the flanges 79 and 82, to rotate in spaced relation to walls 29 and 30, and with very little frictional resistance to such rotation.

Figure 12:
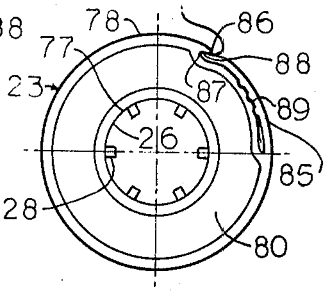

Each of the reels includes an integral cantilever jaw 85 at the reel periphery. In addition, the reel has a lip 86 adjacent a notch 87, and the jaw is movable from an outer position spaced from the lip (see FIG. 11) to an inner position in which the jaw terminal 88 is retained in the notch by the lip. The tape terminal 89 is insertible between the jaw and reel body in the outer position of the jaw, and that terminal is clamped to the reel body by the jaw in jaw inner position as seen in FIG. 12. Interfitting serrations 90 on the reel body and jaw retain the tape terminal in position as seen in FIG. 12, so that the tape may be wound and held on the reel in a roll as seen at 34 and 35 in FIG. 7.

TAPE FEED CONTROL

Figure 15:
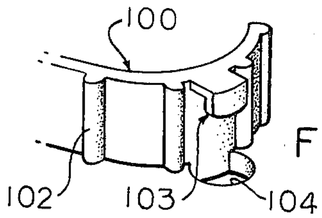
FIG. 15 is an enlarged perspective showing detailed structure of a tape guide.
Figure 16:
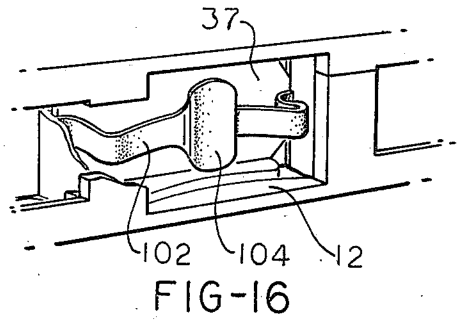
FIG. 16 is an enlarged perspective showing the construction of the integral resilient arm and pressure pad assembly.

When the tape has been connected to the reels, the latter are loaded into the receptacle to appear as in FIG. 7. It is then very easy to place tape segment or loop 33 in guided position for tracking adjacent the openings 11–13, since all of the structure past which the tape travels is integral with the receptacle. Note in this regard the tape guides 100 and 101 extending convexly toward the front corners of the receptacle, and with sufficiently reduced curvature as to turn the tape loop directions with minimum drag. Touch point ribs or serrations 102 on these guides, as see in FIG. 15, contribute to reduced drag. Note also the integral overhang or hook 103 which retains the tape against jumping away from the guide. A hole 104 in the receptacle wall 30 opposite the overhang permits insertion of tooling to form the integral overhang during injection molding. Similar holes in the cover and receptacle walls 29 and 30 permit tool insertion for forming of other integral parts.

As the tape rolls 34 and 35 rotate, they may bear against narrow ribs 62 and 63, depending upon whether the cover or receptacle is beneath the rolls. Such ribbing reduces frictional drag so as to eliminate need for additional anti-friction devices such as auxiliary sheets within the case.

FIGS. 5, 7 and 8 show the tape loop tracking past the openings 11–13 which receive the heads 15 and 16 and pressure roller 17 during operation of the cassette. In this regard, the playback unit includes auxiliary post which are receivable in openings 98 in the walls 29*a* and 30*a* of the cassette for backing up the tape loop 33 at tape locations engaged by head 15 and roller 17. At such times, the tape loop 33 travels in the channel 99 between the front lip 110 of the receptacle and the touch points 111.

Figure 17:
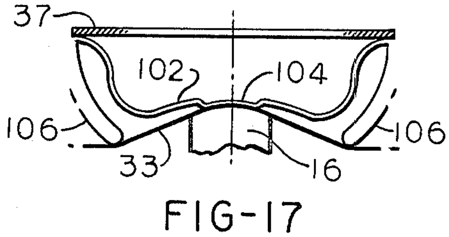
FIG. 17 is a plan view showing the manner in which tape travels adjacent the resilient arm and pressure pad assembly.

Also molded integrally with the receptacle is the resilient, thin plastic pressure arm 102, which is generally U-shaped and extends concavely toward the tape 33 as seen in FIG. 17. A pressure pad or button 104 on the arm projects toward the tape for engagement therewith opposite the magnetic head 16. As a result, the tape travels with no frictional contact with the arm 102, excepting at the narrow pad 104. Note touch points 106 integral with the receptacle and which hold the tape spaced from the arm 102. A so-called mu-metal plate 37 is received in the space 107 immediately behind the arm 102, for magnetic field interaction with the head 16 during playback or recording.

I claim:

1. In amagnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising multiple tongue and groove interconnections on the cover and receptacle elements for distributing interconnection loading, said interconnections having certain portions projecting generally normal to said one wall containing said openings and other portions projecting generally parallel to said wall, and flexible plastic strap hinge means integral with and interconnecting said cover and receptacle elements at another edge of the case and spaced from said apertured edge, the overall length of said strap hinge means in the direction between the cover and receptacle being substantially equal to the overall height of the main extent of the case between said walls, the cover and receptacle being relatively closable together generally normal to said one wall and then relatively movable parallel to said one wall as accommodated by said hinge means to interfit said tongues and grooves acting to guide said relative movement of the cover and receptacle elements for bringing said openings in said one wall into generally central registration with said reels.

2. In amagnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising multiple tongue and groove interconections on the cover and receptacle elements for distributing interconnection loading, said interconnections having certain portions projecting generally normal to said one wall containing said openings and other portions projecting generally parallel to said wall, the cover and receptacle being relatively closable together generally normal to said one wall and then relatively movable parallel to said one wall to interfit said tongues and grooves acting to said guide said relative movement of the cover and receptacle elements for bringing said openings in said one wall into generally central registration with said reels, said reels having openings therethrough to receive said posts, said wall openings being contained in both of said cover and receptacle walls to register with said reel openings, each reel having an annular recess about said reel opening and presented toward the said receptacle wall, the reel including an annular boss projecting toward the opening in said receptacle wall, an annular flange on said receptacle wall and projecting into the reel recess in losely confining relation of said boss, the reel having an annular face presented toward the cover wall, an annular flange on said cover wall and projecting toward said reel annular face, the reel being confined by the terminals of said annular flanges to rotate in spaced relation to said cover and receptacle walls.

3. The combination of claim 1 wherein said reels have openings therethrough to receive said posts, said wall openings being contained in both of said cover and receptacle walls to register with said reel openings, and spaced narrow ribs on the inner sides of said walls and projecting away from said wall openings to support said tape rolls during roll rotation on the reels.

4. The combination of claim 2 wherein said cover and receptacle comprise plastic material, and plastic strap hinge means interconnecting said cover and receptacle at another edge of the case spaced from said apertured edge of the case but extending generally parallel thereto, said hinge means accommodating folding together of the cover and receptacle elements into position for said interfitting of the tongues and grooves.

5. The combination of claim 1 wherein said case is generally rectangular and relatively thin, the case having parallel third and fourth edges extending generally perpendicularly to said apertured edge and said other edge of the receptacle, said interconnections being located at said third and fourth edges and also within the interior of the case.

6. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising multiple tongue and groove interconnections on the cover and receptacle elements for distributing interconnection loading, said interconnections having certain portions projecting generally normal to said one wall containing said openings and other portions projecting generally parallel to said wall, the cover and receptacle being relatively closable together generally normal to said one wall and then relatively movable parallel to said one wall to interfit said tongues and grooves acting to guide said relative movement of the cover and receptacle elements for bringing said openings in said one wall into generally central registration with said reels, and including a deflectable catch carried by one of the receptacle and cover elements and a shoulder carried by the other of the elements for snap-locking engagement with the catch, one of said elements containing a small port to receive a tool for deflecting the catch to release said shoulder permitting opening of the case.

7. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising multiple tongue and groove interconnections on the cover and receptacle elements for distributing interconnection loading, said interconnections having certain portions projecting generally normal to said one wall containing said opeings and other portions projecting generally parallel to said wall, the cover and receptacle being relatively closable together generally normal to said one wall and then relatively movable parallel to said one wall to interfit said tongues and grooves acting to guide said relative movement of the cover and receptacle elements for bringing said openings in said one wall into generally central registration with said reels, said cover and receptacle comprising molded plastic material, and including a resilient plastic pressure arm on the receptacle and a pressure pad projecting on said arm for engagement with the tape proximate one of said apertures, thereby spacing the tape from dragging against the arm.

8. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on theother reel in response to post rotation, the improvement comprising multiple tongue and groove interconnections on the cover and receptacle elements for distributing interconnection loading, said interconnections having certain portions projecting generally normal to said one wall containing said openings and other portions projecting generally parallel to said wall, the cover and receptacle being relatively closable together generally normal to said one wall and then relatively movable parallel to said one wall to interfit said tongues and grooves acting to guide said relative movement of the cover and receptacle elements for bringing said openings in said one wall into generally central registration with said reels, and including guides to guide tape segment travel past said apertures, said guides being integral with at least one of said receptacle and cover elements and having ribs defining touch points for tape engagement and acting to turn the path of tape travel proximate corners of the case and to space the tape from the cover and receptacle walls.

9. The combination of claim 1 wherein at least one of said reels includes an integral cantilever jaw at the reel periphery, the reel having a lip and the jaw being movable from an outer position spaced from said lip to an inner position in which the jaw terminal is retained by said lip, the tape terminal being insertible between the reel and jaw in said outer position of the jaw and said terminal being clamped to the reel by the jaw in said jaw inner position.

10. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing betwen tape rolls on the reels as the tape unwinds off the roll on one reel and winds on the roll on the other reel in response to post rotation, the improvement comprising strap hinge means interconnecting said cover and receptacle at another edge of the case spaced from said apertured edge, said hinge means and the cover and receptacle consisting of integrally molded plastic material in one piece, said hinge means accomodating folding together and shifting of the cover and receptacle elements for interconnection, the overall length of said strap hinge means in the direction between the cover and receptacle being substantially equal to the overall height of the main extent of the case between said walls.

and means for interconnecting said folded together cover and receptacle elements.

11. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising cantilever jaws on the reels, each jaw being elongated and having an end portion integrally molded with the reel, the reel forming an outwardly exposed notch spaced from said end portion, the jaw having a projection sized for tight reception and retention in the notch to retain tape extent therein, the outer face of the jaw conforming generally to reel peripheral curvature when said projection is retained in the notch, the reel being annularly recessed inwardly on one side thereof to loosely receive a circular flange on the receptacle element, and the reel having a web portion that protrudes into said annular recess radially inwardly of the cantilever jaw.

12. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing between tape rolls on the reels as the tape unwinds off the roll on one reel and winds on the roll on the other reel in response to post rotation, the improvement comprising guides to guide tape segment travel past said apertures, said guides being integral with at least one of said receptacle and cover elements and having ribs defining touch points for tape engagement and acting to turn the path of tape travel proximate corners of the case.

13. In a magnetic tape cassette assembly having cover and receptacle elements defining a case with apertures along an edge thereof for exposing tape to contact with playback unit head means, a pair of tape reels mounted to rotate within the case, the cover and receptacle having opposite walls and openings contained in at least one of said walls through which the reels are exposed for driven engagement with playback unit drive posts, a segment of the tape passing betwen tape rolls on the reels as the tape unwinds off the roll on one reel and winds on the roll on the other reel in response to post rotation, the improvement comprising a resilient pressure arm on the receptacle and a pressure pad projecting on the arm for engagement with the tape proximate one of said apertures thereby spacing the tape from dragging against said arm, the pad having concave surface to engage the tape, the arm having curved extents projecting toward the tape at opposite sides of the pad, and there being means on the receptacle to guide tape travel out of engagement with said arm curved extents.

References Cited

UNITED STATES PATENTS

| | | | |
|---|---|---|---|
| 2,989,261 | 6/1961 | Gillette et al. | 242—55.13 |
| 3,008,661 | 11/1961 | Estes et al. | 242—55.13 |
| 3,104,846 | 9/1963 | Ringle | 242—71.1 |
| 3,127,989 | 4/1964 | Travaglio | 206—52 |
| 3,132,822 | 5/1964 | Arthur | 242—68.5 |
| 3,140,832 | 7/1964 | Cech | 242—55.13 |
| 3,195,828 | 7/1965 | Kuckhoff et al. | 242—74.1 |

FOREIGN PATENTS

| | | |
|---|---|---|
| 1,052,249 | 12/1966 | Great Britain. |

GEORGE F. MAUTZ, Primary Examiner

U.S. Cl. X.R.

179—100.2; 226—196; 242—74.1, 76; 274—4